Patented Feb. 17, 1942

2,273,461

UNITED STATES PATENT OFFICE 2,273,461

PROCESS FOR THE PRODUCTION OF CALCIUM METAPHOSPHATE AND HYDROGEN

Stephen Brunauer and John Floid Shultz, Washington, D. C. assignors to Henry A. Wallace, as Secretary of Agriculture of the United States of America, and his successors in office No Drawing. Application February 29, 1940, Serial No. 321,388

8 Claims. (Cl. 23—108)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

The process discovered by us relates to an improved method of oxidizing phosphorus and obtaining hydrogen as a valuable by-product. It consists essentially of making steam and phosphorus react with each other in the presence of phosphate rock at a temperature of 900° C. or higher. The phosphoric oxide produced reacts with the phosphate rock to form calcium metaphosphate, a substance especially suitable for use as phosphate fertilizer. The hydrogen of the steam is liberated and after a simple purification is suitable for use in the manufacture of synthetic ammonia, in the hydrogenation of oils, or in other hydrogenation processes.

Three methods have been proposed to effect the oxidation of elementary phosphorus to phosphorus pentoxide. The simplest method is to burn it in air, at the same time it is the most wasteful one. Phosphorus is usually obtained commercially in furnaces by the reaction of carbon with phosphate rock. For each volume of gaseous phosphorus produced in the furnace ten volumes of carbon monoxide are also produced. If the resulting gas mixture is burned now in air, all of the carbon monoxide is lost, because it is oxidized to carbon dioxide. This is a wasteful process, since carbon monoxide is a valuable gas; it can be used as a fuel gas, or it can be converted by means of steam into carbon dioxide and hydrogen over a catalyst. To save the carbon monoxide a modification of this method has been devised (H. A. Curtis, Chem. and Met. Eng. 42, June 1935), in which the phosphorus is separated by condensation from the carbon monoxide, the former is then burned in air, the latter is thus saved.

The second method is a considerable improvement over the first. It consists of oxidizing the phosphorus by means of carbon dioxide, instead of air. (French Patents 624,438, 1927; 640,287, 1928; German Patents 531,498, 1931; 540,068, 1931; 528,504, 1931.) The gases issuing from the furnace are brought in contact with sufficient quantities of carbon dioxide at 900° C. or higher temperatures. The carbon dioxide reacts with the phosphorus vapor and for each volume of phosphorus vapor oxidized to the pentavalent oxide, ten volumes of carbon monoxide are produced. Thus, in the process not only all of the carbon monoxide produced in the furnace is saved, but an approximately equal quantity of added carbon monoxide is produced by the oxidation process. However, if the carbon monoxide is to be utilized in a more profitable manner than merely as a fuel gas, it has to be converted in a separate process with steam into hydrogen and carbon dioxide over a catalyst. The hydrogen, after a laborious process of purification can then be used for the manufacture of ammonia or in other hydrogenation processes.

The third method for the oxidation of phosphorus does away with the above-mentioned expensive extra process and yields directly hydrogen as by-product instead of carbon monoxide. It consists of oxidizing the phosphorus vapor by means of steam at temperatures of 1000° C. or higher; for each volume of phosphorus vapor oxidized to the pentavalent state 10 volumes of hydrogen are obtained. We are aware that patents were granted to Liljenroth on this process. (Canadian Patents 247,164, 1925; 246,431, 1925; U. S. Patents 1,594,372, 1926; 1,605,-960, 1926; 1,673,691, 1928.)

Our invention is an important and essential improvement in the process of oxidizing phosphorus vapor by means of steam over the process described in Liljenroth's patents. In order to show the manner in which our invention improves the process, we must discuss the difficulties attendant upon the method used by Liljenroth.

The first difficulty is that under the conditions described by Liljenroth considerable quantities of phosphorus remain unconverted into the oxides, as we have found from our experiments. This difficulty is overcome if air is mixed with the steam in sufficient quantity to oxidize the unreacted phosphorus. This case is also covered in Liljenroth's patents. However, it is obvious that this method is wasteful, since if 15% of the phosphorus is burned with air instead of steam, the yield of hydrogen will be 15% less than otherwise would be. Our invention eliminates this waste, as will be described later.

The second difficulty is the production of phosphine in the method used by Liljenroth. Liljenroth reported that at temperatures "far below" 1000° C. the yield of hydrogen would be lower due to the formation of increasing quantities of phosphine. (U. S. Patent 1,594,372, 1926.)

As a matter of fact, we have found from our experiments that even at as high temperature as 1100° C. as much as 5% of the hydrogen may be converted into phosphine. This side reaction is not only wasteful, because it uses up hydrogen and phosphorus, but if the hydrogen is subsequently to be used in the synthesis of ammonia it must be very carefully purified from phosphine, since the latter severely poisons the synthetic ammonia catalysts. Our invention does away with this difficulty too, as will be described later.

Finally the third and most serious difficulty with the method of Liljenroth is that the steam does not oxidize all of the phosphorus to the state of phosphorus pentoxide. An equilibrium exists in the system $P_2O_5$—$H_2$—$P_2O_4$—$H_2O$, such that under all conditions mixtures of $P_2O_5$ and $P_2O_4$ are obtained as our experiments at 1000° C. and 1100° C. very definitely showed. When the phosphorus vapor is converted into phosphorus tetroxide only 8 volumes of hydrogen are obtained for each volume of oxidized phosphorus vapor, thus the yield of hydrogen is 20% lower than when the oxidation of the phosphorus goes to the pentavalent state. However, there is even a greater difficulty than that. The mixture of $P_2O_4$ and $P_2O_5$ cannot be easily converted into pure phosphoric acid, since the tetroxide when dissolved in water forms phosphorous acid as well as phosphoric acid. Thus one has to resort to a separate process of oxidizing the $P_2O_4$ to $P_2O_5$ whenever one needs pure phosphoric acid, or phosphates free from phosphorous acid or phosphites. Such is the case, for example, in phosphate fertilizers, where the lower oxide of phosphorus and its salts are definitely harmful to plants. Our invention eliminates also this third and most serious difficulty.

This invention consists of making phosphorus and steam react with each other as they pass through a bed of phosphate rock at a temperature of 900° C. or higher. The phosphate rock reacts with phosphorus pentoxide to form a product that is essentially calcium metaphosphate. (See U. S. Patent 1,925,645 and 1,925,644; also German Patent 541,178, 1930.) To explain the action of the phosphate rock one must consider three chemical equilibria that exist in the system:

(1) $P_4 + 8H_2O \rightleftarrows P_4O_8 + 8H_2$
(2) $P_4O_8 + 2H_2O \rightleftarrows P_4O_{10} + 2H_2$
(3) $4PH_3 \rightleftarrows P_4 + 6H_2$ The reaction of phosphate rock with $P_4O_{10}$ (phosphorus pentoxide) removes the latter from the equilibrium mixture of reaction (2), consequently more and more of the tetroxide is converted into the pentoxide until all of the tetroxide is removed. The removal of the tetroxide disturbs equilibrium (1) to the right side of the equation, more and more of the unconverted phosphorus is oxidized, until all of it is removed. Finally, the removal of phosphorus disturbs equilibrium (3) to the right side of the equation, the removal of phosphorus removes in turn the phosphine. Thus the presence of phosphate rock eliminates all three difficulties encountered in the method of Liljenroth. It is essential to point out that the phosphate rock used here is not a catalyst, but a reactant. A catalyst cannot disturb chemical equilibria, whereas the function of the phosphate rock here is exactly to disturb the above three chemical equilibria in a favorable manner, to produce as final products calcium metaphosphate and hydrogen, essentially as described.

We now describe a method of carrying out our process. Steam and phosphorus vapor are passed upward, through a bed of phosphate rock at a temperature of 900–1200° C., preferably around 1100° C. The ratio of steam to phosphorus should be at least twice the stoichiometric ratio of ten to one by volume, preferably higher. Phosphate rock is fed at the top of the furnace continuously to replace the material that has already reacted; the calcium metaphosphate can be tapped off at the bottom of the furnace in the molten state. Calcium metaphosphate obtained from Florida phosphate rock contained 67.5% $P_2O_5$ on analysis, this is actually somewhat more $P_2O_5$ than pure calcium metaphosphate contains. The hydrogen obtained in the reaction contains no phosphine, but it contains some gaseous impurities that come from the rock. We have found, however, that all of these impurities can be scrubbed out with alkali; the gas obtained after the alkali scrubbing is pure hydrogen.

One may devise modifications of our process, the essentials of which are the use of steam as oxidizing agent for phosphorus in the presence of phosphate rock, or any other substance that is capable of combining with phosphorus pentoxide preferentially (rather than with the tetroxide). Such other substances are, for example, calcium carbonate and calcium sulfate, both of which form calcium metaphosphate with $P_2O_5$. Other reactants than calcium compounds may be used to shift the $P_2O_4$—$H_2O$—$P_2O_5$—$H_2$ equilibrium, such as potassium carbonate, potassium sulfate, sodium carbonate, sodium bicarbonate, wyomingite, green sand, silica, alumina, etc. Another type of modification of our process may come by incorporating other gases along with the steam and phosphorus in the presence of phosphate rock. One may add the steam not to the phosphorus vapor, but to the mixture of phosphorus and carbon monoxide issuing from the furnace, in the presence of phosphate rock. As long as the reaction is carried out in the presence of some reactant that removes the $P_2O_5$, the method is essentially the same as the one proposed here. Similarly some air or oxygen may be admitted along with the steam-phosphorus mixture, or the steam-phosphorus-carbon monoxide mixture. As long as the oxygen is not sufficient to oxidize all of the hydrogen produced in the reaction, and the reaction is carried out in the presence of a reactant that removes the $P_2O_5$, the method is essentially the same as ours. The same is true if the phosphorus is partially oxidized to one of its lower oxides, and then this lower oxide is oxidized in a separate process to $P_2O_5$ by means of steam in the presence of phosphate rock or another similar reactant.

Having thus described our invention, what we claim for Letters Patent is:

1. A method for the simultaneous production of calcium metaphosphate and hydrogen, which comprises passing upward through a bed of phosphate rock a mixture of steam and phosphorus vapor in which the ratio of steam to phosphorus is greater than ten to one by volume, the while maintaining a temperature of at least 900° C. and at substantially atmospheric pressure; thereby obtaining as products substantially pure calcium metaphosphate free of phosphite, and hydrogen.

2. A method for the simultaneous production of calcium metaphosphate and hydrogen, which comprises passing upward through a bed of phosphate rock a mixture of steam and $P_2O_5$, $P_2O_4$, and $P_2O_3$ in which the concentration of $H_2O$ is greater than that stoichiometrically necessary for the oxidation of the lower oxides of phosphorus to phosphorus pentoxide, the while maintaining a temperature of at least 900° C. and at substantially atmospheric pressure; thereby obtaining as products substantially pure calcium metaphosphate free of phosphite, and hydrogen.

3. A method for the simultaneous production of calcium metaphosphate and hydrogen, which comprises passing upward through a bed of phosphate rock a mixture of steam, oxygen, carbon monoxide and phosphorus vapor in which at least the stoichiometric quantity of steam and oxygen is present for oxidizing the phosphorus to phosphorus pentoxide, and in which the quantity of oxygen is not sufficient to oxidize both the phosphorus and the hydrogen to phosphorus pentoxide and water, respectively, the while maintaining a temperature of at least 900° C. and at substantially atmospheric pressure; thereby obtaining as products substantially pure calcium metaphosphate free of phosphite, and hydrogen.

4. A method for the simultaneous production of calcium metaphosphate and hydrogen, which comprises passing upward through a bed of phosphate rock a mixture of steam, oxygen, carbon monoxide, and $P_2O_5$, $P_2O_4$, and $P_2O_3$, in which at least the stoichiometric quantity of steam and oxygen is present for oxidizing the lower oxides of phosphorus to phosphorus pentoxide, and in which the quantity of oxygen present is not sufficient to oxidize both the lower oxides of phosphorus and hydrogen to phosphorus pentoxide and water, respectively, the while maintaining a temperature of at least 900° C. and at substantially atmospheric pressure; thereby obtaining as products substantially pure calcium metaphosphate free of phosphite, and hydrogen.

5. A method for the simultaneous production of phosphite free phosphate and hydrogen, which comprises passing upward through a bed of a naturally occurring rock that is capable of reacting with $P_2O_5$, but does not react with $P_2O_4$ or the other lower oxides of phosphorus, a mixture of steam and phosphorus vapor in which the ratio of steam to phosphorus is greater than ten to one by volume, the while maintaining a temperature of at least 900° C. and at substantially atmospheric pressure; thereby obtaining as products a phosphate free of phosphite, and hydrogen.

6. A method for the simultaneous production of phosphite free phosphate and hydrogen, which comprises passing upward through a bed of a naturally occurring rock that is capable of reacting with $P_2O_5$, but does not react with $P_2O_4$, or the other lower oxides of phosphorus, a mixture of steam $P_2O_5$, $P_2O_4$, and $P_2O_3$ in which the concentration of $H_2O$ is greater than that stoichiometrically necessary for the oxidation of the lower oxides of phosphorus to phosphorus pentoxide, the while maintaining a temperature of at least 900° C. and at substantially atmospheric pressure; thereby obtaining as products a phosphate free of phosphite, and hydrogen.

7. A method for the simultaneous production of phosphate and hydrogen, which comprises passing upward through a bed of naturally occuring rock that is capable of reacting with $P_2O_5$, but does not react with $P_2O_4$ or the other lower oxides of phosphorus, a mixture of steam, oxygen, carbon monoxide and phosphorus vapor in which at least the stoichiometric quantity of steam and oxygen is present for oxidizing the phosphorus to phosphorus pentoxide and in which the quantity of oxygen is not sufficient to oxidize both the phosphorus and the hydrogen to phosphorus pentoxide and water, respectively, the while maintaining a temperature of at least 900° C. and at substantially atmospheric pressure; thereby obtaining as products a phosphate free of phosphite, and hydrogen.

8. A method for the simultaneous production of phosphate and hydrogen, which comprises passing upward through a bed of a naturally occurring rock that is capable of reacting with $P_2O_5$, but does not react with $P_2O_4$ or the other lower oxides of phosphorus a mixture of steam, oxygen, carbon monoxide, $P_2O_5$, $P_2O_4$, and $P_2O_3$, in which at least the stoichiometric quantity of steam and oxygen is present for oxidizing the lower oxides of phosphorus to phosphorus pentoxide, and in which the quantity of oxygen present is not sufficient to oxidize both the lower oxides of phosphorus and hydrogen to phosphorus pentoxide and water, respectively, the while maintaining a temperature of at least 900° C. and at substantially atmospheric pressure; thereby obtaining as products a phosphate free of phosphite, and hydrogen.

STEPHEN BRUNAUER.
JOHN FLOID SHULTZ.